(12) United States Patent
Vaananen

(10) Patent No.: US 11,315,091 B2
(45) Date of Patent: Apr. 26, 2022

(54) METHOD AND MEANS FOR SOCIAL NETWORK PAYMENTS

(71) Applicant: Mikko Vaananen, Helsinki (FI)

(72) Inventor: Mikko Vaananen, Helsinki (FI)

(*) Notice: Subject to any disclaimer, the term of this patent is extended or adjusted under 35 U.S.C. 154(b) by 25 days.

(21) Appl. No.: 15/367,200

(22) Filed: Dec. 2, 2016

(65) Prior Publication Data
US 2017/0169408 A1 Jun. 15, 2017

Related U.S. Application Data

(63) Continuation of application No. PCT/FI2016/050820, filed on Nov. 22, 2016, and a continuation of application No. 15/060,659, filed on Mar. 4, 2016.
(Continued)

(51) Int. Cl.
*G06Q 20/10* (2012.01)
*H04M 15/00* (2006.01)
(Continued)

(52) U.S. Cl.
CPC .......... *G06Q 20/102* (2013.01); *G06Q 20/02* (2013.01); *G06Q 20/381* (2013.01); *G06Q 30/04* (2013.01);
(Continued)

(58) Field of Classification Search
CPC ...... G06Q 20/102; G06Q 40/12; G06Q 20/02; G06Q 20/381; G06Q 30/04; G06Q 40/04;
(Continued)

(56) References Cited

U.S. PATENT DOCUMENTS 8,621,215 B1   12/2013   Iyer
8,688,563 B2    4/2014   Mehew et al.
(Continued)

FOREIGN PATENT DOCUMENTS

JP    2017534972 A    11/2017

OTHER PUBLICATIONS

Kucukcay, I. et al. "Mobile Social Commerce Implementation". MEDES'14, Sep. 15-17, 2014, Buraidah Al Qassim, Saudi Arabia. 2014. http://dx.doi.org/10.1145/2668260.2668276 (Year: 2014).*
(Continued)

*Primary Examiner* — Narayanswamy Subramanian
*Assistant Examiner* — Ayal I. Sharon
(74) *Attorney, Agent, or Firm* — Patterson + Sheridan, LLP

(57) ABSTRACT

The invention relates to the field of making online payments by integrating social networks and payment networks to a seamless network. In particular, the invention leverages the information in the social network to conduct financial transactions.

The best mode of the invention is considered to be a social payment network app that incorporates all or most of the functions of credit cards, internet banking and money order companies by using the data and functions already available in the social network.

The invention provides better counterparty recognition, reduces the chance of fraud, or fraud, and provides a cheaper payment platform to consumers (110, 410) or small businesses while also reducing the administrative burden in making and paying purchases or reporting payments and/or expenses to third parties, such as the employer or tax administration.

27 Claims, 9 Drawing Sheets

Related U.S. Application Data

(60) Provisional application No. 62/266,737, filed on Dec. 14, 2015.

(51) Int. Cl.

| | | |
|---|---|---|
| *H04W 4/24* | (2018.01) | |
| *G06Q 30/04* | (2012.01) | |
| *G06Q 20/02* | (2012.01) | |
| *G06Q 40/04* | (2012.01) | |
| *G06Q 50/00* | (2012.01) | |
| *G06Q 40/00* | (2012.01) | |
| *G06Q 20/38* | (2012.01) | |
| *H04L 29/08* | (2006.01) | |
| *H04L 67/306* | (2022.01) | |

(52) U.S. Cl.
CPC .............. *G06Q 40/04* (2013.01); *G06Q 40/12* (2013.12); *G06Q 50/01* (2013.01); *H04M 15/00* (2013.01); *H04M 15/68* (2013.01); *H04M 15/93* (2013.01); *H04W 4/24* (2013.01); *H04L 67/306* (2013.01)

(58) Field of Classification Search
CPC ...... G06Q 50/01; H04M 15/00; H04M 15/68; H04M 15/93; H04W 4/24
USPC .................................. 705/35–45; 405/35–45
See application file for complete search history.

(56) References Cited

U.S. PATENT DOCUMENTS

| | | | |
|---|---|---|---|
| 8,812,392 | B2 | 8/2014 | Shahghasemi |
| 8,818,868 | B2 | 8/2014 | Faires et al. |
| 10,169,746 | B2 | 1/2019 | Atwal et al. |
| 10,504,099 | B2 | 12/2019 | Melgar et al. |
| 10,740,751 | B1 | 8/2020 | Doss |
| 2002/0152160 | A1 | 10/2002 | Allen-Rouman et al. |
| 2007/0244811 | A1 | 10/2007 | Tumminaro |
| 2007/0255652 | A1 | 11/2007 | Tumminaro et al. |
| 2007/0255653 | A1 | 11/2007 | Tumminaro et al. |
| 2007/0255662 | A1 | 11/2007 | Tumminaro |
| 2008/0086397 | A1* | 4/2008 | Hahn-Carlson ...... G06Q 20/102 705/34 |
| 2009/0119190 | A1 | 5/2009 | Realini |
| 2010/0138343 | A1* | 6/2010 | Davila ................ G06Q 20/042 705/43 |
| 2012/0143761 | A1* | 6/2012 | Doran .................... G06Q 20/40 705/44 |
| 2012/0150605 | A1 | 6/2012 | Isaacson et al. |
| 2012/0239417 | A1 | 9/2012 | Pourfallah et al. |
| 2012/0290474 | A1* | 11/2012 | Hoke .................... G06Q 30/04 705/40 |
| 2013/0103584 | A1* | 4/2013 | Eichner ................ G06Q 20/02 705/44 |
| 2014/0058939 | A1 | 2/2014 | Savla |
| 2014/0108233 | A1 | 4/2014 | Yilgoren et al. |
| 2014/0164199 | A1* | 6/2014 | Wilkes .................. G06Q 40/02 705/35 |
| 2014/0207547 | A1 | 7/2014 | Cheng et al. |
| 2014/0279509 | A1* | 9/2014 | Khilnani ................ G06Q 20/12 705/44 |
| 2015/0170112 | A1 | 6/2015 | DeCastro |
| 2016/0012465 | A1 | 1/2016 | Sharp |
| 2016/0307249 | A1* | 10/2016 | Ku ..................... G06Q 30/0613 |

OTHER PUBLICATIONS

International Search Report and Written Opinion for International Patent Application No. PCT/FI2016/050820 dated Feb. 10, 2017.
"Pay Dialog—Payments for games," accessed at https://developers.facebook.com/docs/payments/reference/paydialog, accessed on Nov. 26, 2015, pp. 6.
Alireza Beikverdi; InHwan Kim; JooSeok Song. "Centralized Payment System Using Social Networks Account". 2014 IEEE Fourth International Conference on Big Data and Cloud Computing. Date of Conference: Dec. 3-5, 2014. Electronic ISBN :978-1-4799-6719-3. DOI: 10.1109/BDCloud.2014.39 (Year: 2014).
Google Patents English Language Translation of JP 2017-534972 A. Printed Nov. 2, 2021. (Year: 2021)

* cited by examiner

Payment statement for John Smith

19-Nov-2015

18-Nov-2015

90

Social Payment/Investment statement for group thirsty thursdays, admin: John Smith 19-Nov-2015

18-Nov-2015

METHOD AND MEANS FOR SOCIAL NETWORK PAYMENTS

TECHNICAL FIELD OF INVENTION

The invention relates to the field of making online payments by integrating social networks and payment networks to a seamless network. In particular, the invention leverages the information in the social network to conduct financial transactions.

BACKGROUND

Nowadays, people are more inclined towards making online payments to buy a product rather spending money in cash. This has many advantages for many parties, for example in a more electronic payment environment, governments find it easier to collect taxes.

Paying electronically is still quite difficult and plagued by security concerns. Many times the banks decline completely valid credit card transactions, when they are conducted online due to security concerns. Online payments are also very expensive, sometimes costing 2.5 euros minimum payment +2.5 percent commission when the sale or withdrawal is in another currency. The high cost and complexity of electronic payments is partly explained by the complexity in trying to verify the true party in an electronic transaction, and consequently the fact that the transaction is a true transaction that the customer would not later decline. One prior art document U.S. Pat. No. 8,812,392 is describing prior art methods of establishing trust in an electronic network and is cited here as reference.

It is also a well known fact of prior art bank statements that many times the deducted fee on the bank statement is from an unrecognisable company, because the venue the purchaser actually visited and bought the product or service from, is in fact operated by a financial/legal entity that cannot be clearly associated with the purchase venue by the consumer. Also, when making payment, the prior art internet bank with account number entry is not very descriptive and does not necessarily give reassurance that the correct party is in fact receiving the payment sent.

One network that comprises a lot of info about a lot of people is the social network, like Facebook. Most of the western population is available on the social websites like Facebook, Twitter, etc. In the prior art it is possible to pay via Facebook, for example in order to make purchases in games. This process is described in the non-patent literature reference: "Pay Dialog—Payments for games," accessed at https://developers facebook.com/docs/payments/reference/paydialog, accessed on Nov. 26, 2015, and is cited herein as reference. The payment via this method incurs both wire and/or credit card fees. It is also possible to send payments via Facebook Messenger in accordance with the prior art. However, these payments are nothing but glorified credit card transactions, as the money is drawn via the standard payment methods of credit card/bank account as shown in the aforementioned prior art article.

In the prior art, some nightclub establishments require Facebook credentials in order to screen clients before accepting a reservation and a conventional credit card payment.

One prior art method is also PayPal. This is an expensive low trust method of sending a money order to email, which incurs normal bank and credit card fees in addition to the charges PayPal charges, and provides almost no counterparty trust authentication.

Quite clearly as globalisation progresses, there is a need to alleviate the aforementioned disadvantages.

SUMMARY

This invention integrates the social network and the payment network to a seamless social payment network in order to give consumer the benefit of less wire transfer cost and better counterparty recognition.

The invention is directed towards a system and a method for effectively making a payment to a party via the social network and settling the payment with the parties within the social network or a social payment network directly integrated into the social network, and/or running in parallel with the social network. When the payments are settled within the social network or a payment network directly associated with the social network, there is less need to withdraw or deposit money from traditional credit cards or bank accounts and costs are saved in addition to payment being easier.

A further object of the invention is to present seamless counterparty recognition during payment, and after and before payment, that avoids human mistakes, reduces fraud or possibility of fraud, and provides easy bookkeeping for personal taxation or small business taxation needs.

One aspect of the invention involves a social network third party application, for example a Facebook application that the users of Facebook can download and enable on their smartphones. It integrates with the Facebook app of the user and/or the smartphone operating system of the user's mobile phone. Alternatively, the social third party application can be integrated into the social network app, such as Facebook App, itself.

This social network third party application, which is a social payment application, typically has a secure account that can only be accessed by the Facebook user who has set up the application for himself. The user can deposit or withdraw money to this account from his regular bank account or his credit card. Typically, the deposit or withdrawal is done so, that the user accesses the webpage of the social network payment application, or starts the withdrawal or deposit process from the social network payment application itself. The user is then directed to the webpage of his bank or credit card company where he typically is set up with a process to transfer money to an account in the same jurisdiction and/or currency area which will involve very low fees. For example, in the Eurozone, the user would be directed to make the deposit or withdrawal to a SEPA compliant, i.e. a standard euro payment wire compliant account that will only involve EU regulated wire fees. A US consumer would be directed to deposit or withdraw money to a US bank account that is also subjected to strong competition and US regulation only, which means that the regulation can be enforced with regard to consumer rights, and fees etc.

The user will then deposit money to the social payment account in euro or USD. The deposit can be done for free, or for a very nominal cost. The user will then just start buying products and services with the uploaded money, but the payments are not carried further than the account in the social payment network. When the user receives payments, they are used to increase the account balance of the social payment network account, but similarly the payments are not typically carried forward to the normal bank account or credit card, as this would incur fees.

Another embodiment of the invention focuses on making cost efficient currency transactions. Say a EU consumer or small business visits the US, and has uploaded his money in euro to his social payment network account. The user can buy goods and services in the US normally with the prices USD denominated, and the social payment network account is debited in euros with an exchange rate that is the current market exchange rate up to about 15 min accuracy, or instantaneously. The currency exchange can be made free to the consumer and/or user, or it is possible to provide the currency exchange at a very low fee. All the past payments can be stored to the social network profile of the user, or to the social payment network profile.

According to a further aspect of the invention, standard electronic banking functions are integrated into the user experience of a social network user. Past, present or future payment data can be stored and/or programmed into the payment social network. When the counterparty to the transaction is known, e.g. the party is a friend, or a followed party on the social network, the payment details that would otherwise need to be entered can be populated automatically from the social network data, and/or the user could be given an indication "trusted party" or "successful transaction before", or the like to ease the pressure in inspecting the correctness of the payment to the consumer. Similarly, social network data can be used to populate electronic cheques, money orders, invoices, receipts or any standard payment documents that are typically handled via paper by hand to people, or electronically in an Internet Bank.

Alternatively, the invention can be realised also via another contrary technical route. According to another further aspect of the invention the standard social networking functions, such as photo syncs, sharing, friend connections, friending, posts, wall and the like are integrated into an existing Internet banking and/or credit card payment network software. In this implementation all the social user data is imported to the payment network to increase counterparty recognisability and the trust in authentication. People are individuals, but in many aspects characterised by the friends they keep, so it will be impossible for John Smith with e.g. Marge Simpson as friend, to dispute a purchase that was made by his profile, if the counterparty can verify accordingly: Did you purchase this? Is Marge Simpson your friend? Should we ask Marge Simpson whether she knows John Smith? The invention will make it very difficult for people to present themselves as something different to what they are, because they carry more of their life in the social network profile with them.

Some or all of the aforementioned advantages of the invention are accrued with an embodiment where the user's own social network profile or social payment network profile is/are stored so that it can be broadcasted or sent via short range radio communication devices such as NFC or Bluetooth or Wi-Fi. This allows the user to easily make payments in the real world on the streets and so on. Say the user is about to buy a train ticket at the station or the train. The social payment network system can easily deduce the correct ticket and payment using the social network profile of the user for example by determining his age, residency and so forth that might influence the ticket. The user can also very easily observe that he is making the payment to the right party, if for example in Victoria station London, he is displayed the social payment network page of the Tube, the London underground. The user can simply make the payment of the ticket then and there via NFC or Wi-Fi or Bluetooth, or the like connection, and proceed with his journey. The cost of the ticket can easily be shared with an employer for expensing or other purposes from the Social network profile or social payment network profile.

A Payment Network System in accordance with the invention comprises at least one network computer and is characterised in that, at least one customer in said payment network system is configured to send at least one payment to at least one vendor via social network user profile of said customer, and/or collect payment detail data from the social network user profile data and/or, at least one vendor in said payment network system is configured to receive at least one payment from at least one customer via social network user profile of said vendor and/or collect payment detail data from the social network user profile data.

A method in accordance with the invention in an electronic payment network, and is characterised in that, at least one customer in said payment network system sends at least one payment to at least one vendor via social network user profile of said customer, and/or collects payment detail data from the social network user profile data and/or, at least one vendor in said payment network system receives at least one payment from at least one customer via social network user profile of said vendor, and/or collects payment detail data from the social network user profile data.

A software program product in accordance with the invention to transact electronic payments in a communication network is stored on a memory medium and is characterised in that, at least one customer in said payment network system is configured to send at least one payment to at least one vendor via social network user profile of said customer, and/or collect payment detail data from the social network user profile data and/or, at least one vendor in said payment network system is configured to receive at least one payment from at least one customer via social network user profile of said vendor, and/or collect payment detail data from the social network user profile data.

In addition, and with reference to the aforementioned advantage accruing embodiments, the best mode of the invention is considered to be a social payment network app typically on a smartphone that is integrated with a server network and a social network via an app. The best mode will incorporate all or most of the functions of credit cards, internet banking and money order companies by using the data and functions already available in the social network. In the best mode the using consumer and the vendor of the product/service exchange social network data with each other. The user consumer will obtain a more detailed record of his spending transactions as it is enriched by the social network data such as image and trade name of the vendor and/or the product or service bought. The vendor will get the social network data (such as age, sex, job, location, number of friends) of consumers who actually bought the product or service.

The invention provides better counterparty recognition, reduces the chance of fraud, or fraud, and provides a cheaper payment platform to consumers or small businesses while also reducing the administrative burden in making and paying purchases or reporting payments and/or expenses to third parties, such as the employer or tax administration. The invention also makes it possible for the vendors to sell the products at cheaper prices to those consumers that provide their social network data as considerable cost savings by means of more focused marketing are accrued.

Some of the embodiments are described in the dependent claims.

DETAILED DESCRIPTION OF EMBODIMENTS

Figure 1:
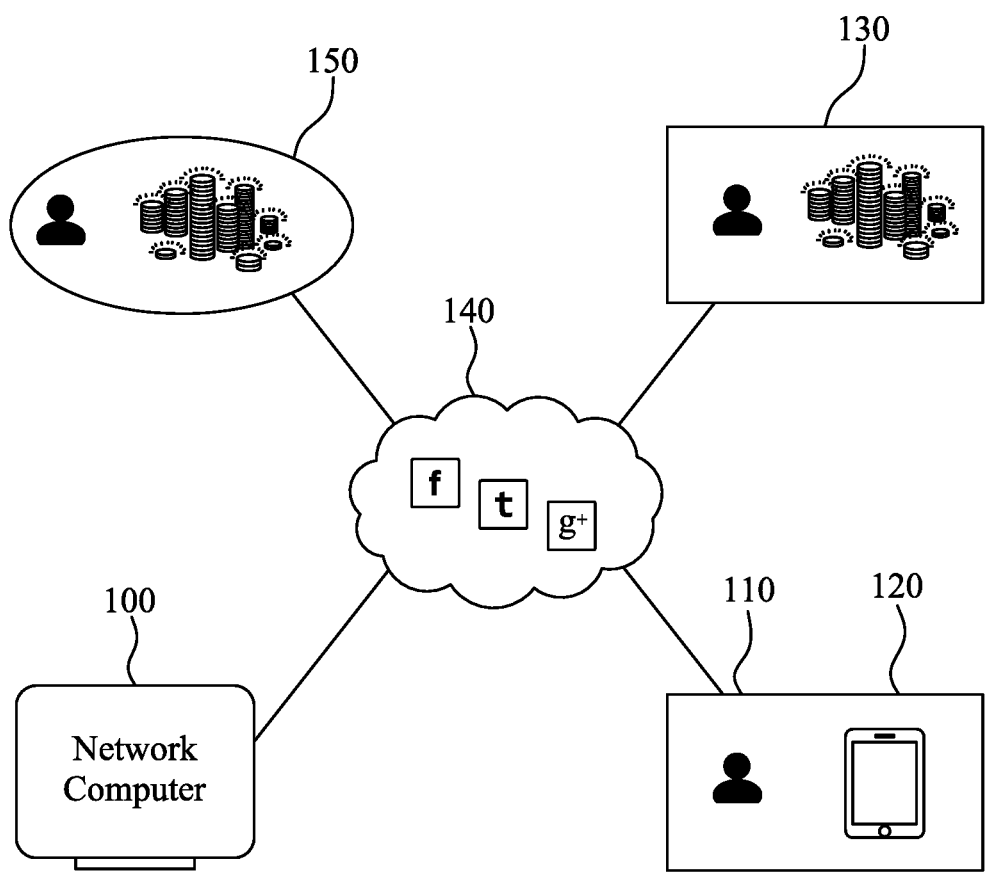
FIG. 1 demonstrates an embodiment 10 of the payment network system as a block diagram.

FIG. 1 demonstrates an embodiment 10 of the invention as a block diagram. In FIG. 1 there is a network computer 100, which may typically include an input-output device, usually made up of a monitor (display), keyboard, mouse and/or touch screen. However, typically there is more than one computer server in use at one time, so some computers may only incorporate the computer itself, and no screen and no keyboard. These types of computers are typically stored in server farms, which are used to realise the cloud network used by the social payment network of the invention. The cloud network can be purchased as a separate solution from known vendors such as Microsoft and Amazon and HP (Hewlett-Packard). The server computers 100 typically run Unix, Microsoft, iOS, Linux or any other known operating system, and comprise typically a microprocessor, memory, and data storage means, such as SSD flash or Hard drives. To improve the responsiveness of the cloud architecture, the data is preferentially stored, either wholly or partly, on SSD i.e. Flash storage. This component is either selected/configured from an existing cloud provider such as Microsoft or Amazon, or the existing cloud network operator such as Microsoft or Amazon is configured to store all data to a Flash based cloud storage operator, such as Pure Storage, EMC, Nimble storage or the like. Using flash as the backbone storage for the cloud network is preferred despite its high cost due to the reduced latency that is required and/or preferred for payment systems. I.e. when the person is paying the bill in a Helsinki restaurant, there is no need to retrieve all data from a hard drive in San Francisco that would take possibly too much time to leave a happy waiter and customer. Instead the data is pulled from a Flash storage in Munich, Hamina or Stockholm, where the pan-global server farms with flash based capabilities might be located.

FIG. 1 also shows a customer 110 who is a person who intends to buy a product. FIG. 1 also shows a mobile subscriber terminal 120 through which the customer can login to the social network 140, and/or the social payment network of the invention associated therein. The communication network used for the communication in the invention is the Internet or the telephony network, which is typically a cellular network such as UMTS—(Universal Mobile Telecommunication System), GSM—(Global System for Mobile Telecommunications), GPRS—(General Packet Radio Service), CDMA—(Code Division Multiple Access), 3G-, 4G- and/or WCDMA (Wideband Code Division Multiple Access)-network. The mobile subscriber terminal 120 is typically a mobile smartphone, such as iOS, Android or a Windows Phone smartphone.

However, it is also possible that the subscriber terminal 120 is a mobile station, mobile phone or a computer, such as a PC-computer, Apple Macintosh-computer, PDA-device (Personal Digital Assistant), or UMTS—(Universal Mobile Telecommunication System), GSM—(Global System for Mobile Telecommunications), WAP—(Wireless Application Protocol), Teldesic-, Inmarsat-, Iridium-, GPRS—(General Packet Radio Service), CDMA—(Code Division Multiple Access), GPS—(Global Positioning System), 3G-, 4G-, Bluetooth-, WLAN—(Wireless Local Area Network), Wi-Fi and/or WCDMA (Wideband Code Division Multiple Access)-mobile station. Sometimes in some embodiments the subscriber terminal is a device that has an operating system such as any of the following: Microsoft Windows, Windows NT, Windows CE, Windows Pocket PC, Windows Mobile, GEOS, Palm OS, Meego, Mac OS, iOS, Linux, BlackBerry OS, Google Android and/or Symbian or any other computer or smartphone operating system.

The user 110 connects to vendors 150 and 130 via the social network or via the social payment network 140. The social network 140 is typically Facebook, Twitter, LinkedIn, or the like. The user accesses the social network via a website in some embodiments, but preferentially there is a social payment network app installed on the mobile smartphone, that is capable of reading the information from the social network and/or capable of inputting information to the social network.

Preferably the user downloads the app from the Internet, or the various app stores that are available from Google, Apple, Facebook and/or Microsoft. For example, in some embodiments an iPhone user with a Facebook app on his phone will download a social payment network app that is compatible with both the Apple and Facebook developer requirements. Similarly, a customized app can be produced for the other different handset and social network environments. It is possible that the social payment functionality is integrated into a social network, so that a social network app, such as Facebook App would have the payment functionality integrated in itself. Also, it is possible that there is a separate App, lets call it FacePay that interfaces with the Facebook app to provide the payment functionality in a different App, but is able to communicate data with the Facebook App. The Payment functionality of the invention could also be integrated into Facebook Messenger in some embodiments. It is also possible that there is no involvement with the smartphone social network app, i.e. the social payment network app is the only app on the smartphone and any social network data is imported and exported to the social payment app directly from the social network servers.

The vendors 130, 150 are any parties that sell products or services to the customers via the social network or social payment network. The vendors can be large stores like Amazon or Wal-Mart to name some examples, or they may be brick and mortar shops where the user has actually visited and bought and paid products, or the vendors could be individual people with whom the user might send or receive money. The vendors 130, 150 will preferably have a social network account or a social payment network account to which payments can be received.

Therefore, with the social payment network functionality activated at both customer and vendor end, at least one customer in said payment network system is configured to send at least one payment to at least one vendor via social network user profile of said customer, and at least one vendor in said payment network system is configured to receive at least one payment from at least one customer via social network user profile of said vendor. This way, the payments will flow through the user profiles of the respective transaction parties using the social network between the financial accounts in the social network.

Another more secure way of making the transactions is to run a social payment network in parallel with the existing social network. In this implementation, data is read from the social network, and/or contact directory software of the subscriber terminal and/or email software of the terminal device into the social payment network. This way, the data needed to recognise a party is easily incorporated into the social payment network, but higher standards of data security can be applied to the financial transactions than to the communication in the social network. In the case of the invention using Facebook, it might be preferential to use a dedicated app for payment transaction traffic, which would still import data from Facebook, but would not export data back out into Facebook, or vice versa, or would both import and export data to and from Facebook under strict data encryption/security.

One way of realising said social payment network is by providing the social network functionalities, such as sharing, friending, and data such as photos, personal data and connections to an existing payment network software that uses an Internet Banking software and/or network or VISA, MASTERCARD and/or other credit card payment-network and software. For example, photos of account owners could be adjoined to accounts. The photos could be retrieved for example from the social network, such as Facebook or the like.

In some embodiments the bank or the credit card company has a proprietary Facebook app that interfaces with Facebook. In some embodiments the social payment network app, interfaces with Facebook, and also interfaces with the app of the credit card company and/or bank. In this instance the credit card or bank app is typically an iOS, Android, Microsoft or Facebook app. In some embodiments the bank or credit card company has an iOS or Android or Microsoft App, and this interfaces with the Facebook iOS/Android/Windows app. The social payment network app and the bank or credit card company apps can be apps for either a social network like Facebook or apps for the operating system like iOS or Android or Windows, or apps for both the social network and the operating system, i.e. Facebook/Android, Facebook/iOS, Google+/Windows in accordance with the invention. Both the social payment network app and the bank or credit card app can be integrated and/or interfaced with the social network directly or via the operating system app of the social network in the mobile subscriber terminal, for example the Facebook iOS application on the iPhone in accordance with the invention. Needless to say, the examples of Facebook, iOS, Android are not limiting, and the invention can be similarly implemented with any other social network or operating system.

Preferentially, the information flow is unidirectional in some embodiments of the invention for information security reason. For example, the social payment network app and/or the bank or credit card app might be set so that they only read data from the social network, such as Facebook, and/or the operating system, but never release payment data out into the social network or to the operating system. However, duplex communication between the social payment network app and/or the bank or credit card app, and the social network or the operating system is also possible in accordance with the invention. Further the invention encompasses also the embodiment where all payment functionality is integrated into the social network, and the social network unidirectionally only reads bank or credit card apps, but does not allow these to read itself In some embodiments the bank or credit card apps or software allow only small amounts of capital to be used in everyday payments via social network payments to ease the pressures on information security by limiting the potential loss due to technical failure or criminal activity.

Typically, the banking application knows the banking details of the user, and some user details. Similarly, the credit card application will know the credit card details of the customer, and some user details. If the data synchronisation is performed towards the payment network, making it a social payment network in accordance with the invention the following process will in some embodiments occur. The payment network app (either bank, credit card, or $3^{rd}$ party) will lookup data from the social network relating to the user. Clearly, a unique identifier present in both networks would be desirable. In one embodiment the payment network app looks up user information from the social network based upon the telephone number of the user, email of the user, address of the user, name of the user and the like. Once a unique match of person is found, it will copy the data from the social network to the payment network application, thereby creating a social payment network. In some embodiments Facebook or some other social network releases its data to the financial institutions that operate the payment network or the payment network application via typically a secure connection. The payment network or the payment network application may then search and update all social network data of an identified user into the payment network user profile of the user in accordance with the invention.

Vice versa, if payment data is to be transferred to the social network, thereby turning it into a social payment network, the following process will in some embodiments occur. The social network or social network app will lookup data from the payment network (either bank, credit card, or $3^{rd}$ party) relating to the user. Clearly, a unique identifier present in both networks would be desirable. In one embodiment the social network or the social network app looks up user information from the payment network based upon the telephone number of the user, email of the user, address of the user, name of the user and the like. Once a unique match of person is found, it will copy the data from the payment network to the social network or social network application, thereby creating a social payment network. In some embodiments the financial institutions that operate a payment network or a payment network application make their data available to a social network, such as Facebook, via typically a secure connection. The social network or the social network application may then search and update all or some payment network data of an identified user, such as account number, sort code, BIC SWIFT, Routing number, into the social network user profile of the identified user. Alternatively, the social network or social network app may also ask for one or more of the aforementioned banking details, and data can be retrieved from the payment network based on identifying data provided by the user.

Once the social network side and the payment network side are integrated it is possible to realise transactions that are of extremely low cost and high ease of use to consumers within the social network. However, the net balance of these transactions can always be accessible to the more expensive traditional payment networks operated by banks and credit card companies that have local reach in the jurisdiction of the user, and who can identify the user.

Typically, it is preferential to have stronger identification and information security when the sum to be transferred is large. For smaller payments it does not make sense to increase the administrative overhead of actually making the payment too much.

In some embodiments the user profile data, social network data of user such as friends, wall updates, messages and any other data unambiguously associated with the user in the social network, biometric identification such as fingerprint, passcode, password, PIN number and any other identification method can be used separately or in a mix to establish a sufficient level of trust, commensurate with the financial size of the transaction.

In one embodiment the intensity level of identification is configured to vary based on how involved with each other the parties are. A 100 euro transfer from a user to his wife over the social payment network would in some embodiments require no added identification measures, as the payment is staying within the same household, as identified e.g. by the system from social network relationship status. However, a large transfer to a party with whom transaction history does not exist would require a higher level of identification in some embodiments. The higher level of identification means more identification tests/data points in number and more complex and different ways in establishing the identification.

Synchronisation of data among payment networks and social networks is clearly in accordance with the invention. In one embodiment, the user takes a photo of his credit card with a smartphone, for example an iPhone. The social network app or the payment network app is typically authorised to use the camera in this embodiment. The credit card number and possible other details are recognised from the photo by OCR Object Character Recognition or other standard way. After having obtained the credit card details from the photo, the user is possibly asked questions for further details. After having obtained the details, the details can merely be uploaded to the social network as they are, or they can be checked for accuracy manually or by a computer and reformatted, correcting for any inaccuracies and then entered and uploaded to the social network, making it a social payment network.

Similarly banking details can be synchronised into the social network by the user entering his bank account number, e.g. IBAN (International Bank Account Number) or US account number, and/or sort code, SWIFT/BIC and/or Routing number.

Typically, by knowing the bank of the user and his account number the inventive social network can look up all banking details of the user from the server of the said bank and upload them into the social network. Any alternative combination of user information that defines the user uniquely can also be used to synchronise banking information into the social network, such as home address, telephone number, social security number, passport number, driver license number, name and the like. Typically, the user needs to authorise his bank or credit card company to give out any details to the social network. In some embodiments this is done electronically, by using bank or credit card company provided PIN numbers or only once usable code numbers list(s) and/or user ID's, which are typically provided by the bank to the user.

In some embodiments the user who has been identified in the above way can now have his banking or credit card details uploaded to the social network, making it a social payment network. Now in order to transfer money, typically a withdrawal from the credit card or bank account will have to be made to the social payment network. This can be done by assigning an account number in the social payment network to the user. The withdrawal or credit card payment will be made to this account number, and the funds on this account can be used for social payments in accordance with the invention. Typically, this social network financial account is configured so that the user will only have to bear the minimum transaction costs. This would mean that for US users the account would be a US bank account at "Facebook bank", which would mean that the social network would need to get a banking permit from the relevant authorities in the USA. Similarly, for European users the account would preferentially be a SEPA account, and the social network would need to get a banking permit from the relevant European authorities on a national and/or EU level. This would result e.g.in Facebook bank Europe.

Now, in preferred embodiments it is possible for the user to upload money into the social payment network from the social payment network interface. Typically, it would be advisable for consumers to transfer a small/moderate amount of money into the social payment network, e.g. 1000-2000 euros/USD. This way, the financial damage due to identity theft or other accident with the account is not very large, but the efficiency and convenience of social payments for a plurality of small transactions can be harnessed fully. Also, it is possible and in accordance with the invention that a monthly transfer of money from the traditional bank account or credit card company is programmed to take place. This way a meaningful budget is available on the social payment network account for efficient everyday payments, whereas the user can store larger amounts of capital in a traditional bank account or investment account that is not as electronically connected as the social payment account and may have higher levels of information security and regulatory security.

Quite clearly the most efficient payment is from one financial social network account to another financial social network account. However, if the payment recipient does not have a financial social network account to which the payment can be delivered, the social payment can be delivered also via other ways. For example, the social payment network may issue a cheque to the payment recipient, or transfer the money to the conventional bank account of the payment recipient, or credit the credit card or PayPal account of the payment recipient. In this embodiment, the social payment network may calculate the transaction costs that would be incurred for sender and/or recipient and choose the transaction method that minimises transaction cost for sender, recipient or both in accordance with the invention. In one embodiment, the social payment network may also invite payment recipient to open a social financial account, or do that automatically for the payment recipient.

In some embodiments the social payment network may create a social financial account to the payment recipient and credit the payment to that account automatically. Then, the social payment network may send an email to the payment recipient notifying: "a social financial account has been opened for you. Payment from Sender: "John Smith" in XXX euro has been credited to your account. In some embodiments the social financial account with all its functionalities is simply added to the user profile of the recipient automatically, in other embodiments the recipient may be requested to download and install a social payment network app to get access to his social payment network account.

In one preferential embodiment, a currency payment from a first currency to a second currency is configured to be settled with a currency exchange within the said social payment network system. In some embodiments the exchange is done without a fee, i.e. it is provided completely free to consumers. In this embodiment, the operation of the network would be funded by advertisements or by investing the working capital in the global payment network into a risk diversified low risk low income financial structure, like T-Bills or Euro government bonds. The yield on the bonds could be used to finance the running of the social payment network in some embodiments. The system would determine the exchange rate from publicly available sources, like any financial news agency such as Bloomberg/Reuters, or from the equilibrium exchange rate at a major financial exchange, or from the equilibrium exchange rate available in the social payment network itself. The last alternative would become feasible in big transaction volumes, and would probably be the easiest to implement eventually.

Another alternative is to have the system buyer approve an exchange rate during the transaction, and/or the seller approve the exchange rate during the transaction or have both parties approve the exchange rate used. The embodiment where both parties would approve the exchange rate, would make it easier to charge a small transparent fee from the parties, if e.g. the rates approved would be slightly different.

As a default the payer could be configured to be debited in the currency of his account and/or credit card and/or the payment recipient could be configured to be credited in the currency of his account and/or credit card. However, a low cost alternative to many users might simply be to do no currency conversions at all. A lot of the products on the Internet are sold in multiple currencies, and it would be advantageous even to private consumers to keep the US dollars and Euros as they are, and simply use them at the next shop that accepts them.

By using the social payment network of the invention, the user does not need to register himself to buy the product from the vendors. The never ending routine of always entering both traveller details and credit card details to each online travel agency would be greatly diminished in effort and time if the inventive social payment network would be deployed for both consumers and businesses.

The vendor 130, 150 who puts his product or service on sale may market the product or service via his own website, on Amazon or other on-line store, and/or in social network websites. Each sales outlet can be configured with the payment method of the invention, for example by putting a "Buy with Facebook" button on the electronic store, which would cause the auto registration into the social payment network and the filling of the data entries with social network data. Alternatively for example a electronic credit card purchase form, such as that of VISA or MasterCard e.g., could have a "populate form details with Facebook" button, which would populate all user related details from Facebook to the credit card payment system to facilitate easier and more recognisable payment.

One simple practical way to establish the social payment network of the invention would be for a social network to order credit card numbers, for example from VISA, MASTERCARD to each of the user profiles and assign unique credit card details to each profile. Subsequently, a software based banking account integrated with the social network profile would be affixed to each credit card. In this embodiment, the money on the account would not be with a bank, but with the social network operator. The payments would be electronically cleared through the payment network without a bank, resulting in huge cost savings. In one embodiment the social network operator does not make the credit card details or the payment network ID visible to social network users at all. The credit card details are joined to each social network account in the background, but the users interact with social network profiles. When they engage payment activity from their social network profile, the credit card details or payment network ID work in the background as the ultimate and eventual source and destination of payments. The same architecture could be done with bank accounts. The bank account would be granted to the user's profile based on his social network credentials, and the bank account, preferably procured and operated by the social network, would act as the eventual and ultimate source and destination of payments.

Any features of embodiment 10 may be readily combined or permuted with any of the other embodiments 20, 30, 40, 50, 60, 70, 80 and/or 90 in accordance with the invention.

Figure 2:
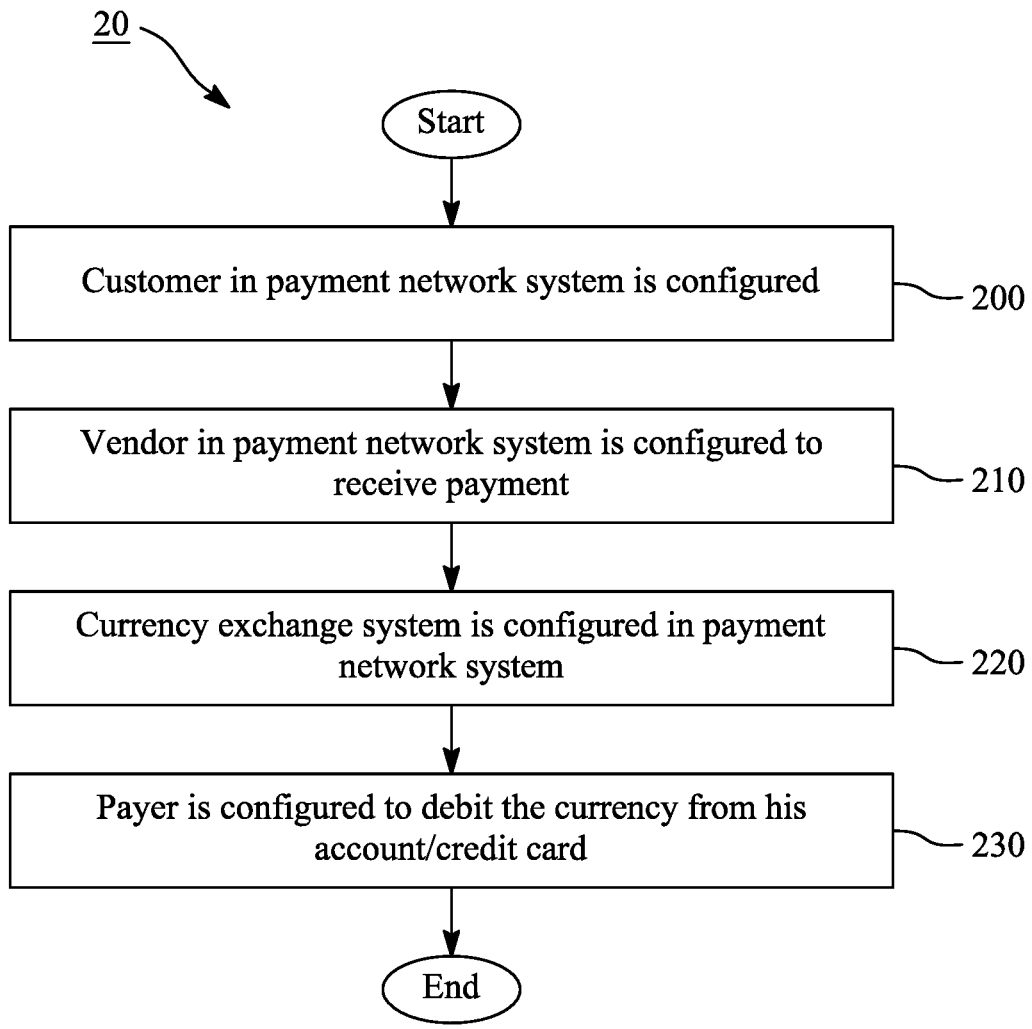
FIG. 2 demonstrates an embodiment 20 of a method for transacting a payment in an electronic payment network in accordance with the invention as a flow diagram.

FIG. 2 demonstrates an embodiment 20 of the invention as a flow diagram. FIG. 2 shows phase 200 where the customer is configured in the social payment network system to debit and credit currency from their financial account associated with the social network. In phase 200 a social network user sets up the financial account on his profile in the social network, and/or downloads a social network application that creates a social payment network in parallel with the social network. The user may upload and/or withdraw money to his account from conventional bank accounts or credit cards, or alternatively he can receive a social payment network payment onto the account.

In phase 210 the vendor is configured in the social payment network system to debit and credit currency from their financial account associated with the social network. In phase 210 a social network vendor user sets up the financial account on his profile in the social network, and/or downloads a social network application that creates a social payment network in parallel with the social network. The vendor user may also upload and/or withdraw money to his account from conventional bank accounts or credit cards, or alternatively he can receive a social network payment onto the account. The social payment network account can also be integrated into the bookkeeping software solution of the vendor in some embodiments.

Ideally phases 200 and 210 happen instantly within a unified global secure network, which can be realised e.g. with a VPN (Virtual Private Network).

In phase 220 the currency exchange system in the social payment network system is configured. When the user completes a purchase in a foreign currency the payment is settled within the social payment network. I.e. A currency payment from a first currency to a second currency is settled with a currency exchange within the said payment network system. In some embodiments the system maintains an instantaneous exchange rate that will make the currency exchange right away at the moment of the purchase. This will enable the social payment network to provide global payment transactions for free or almost for free. In some embodiments a small arbitrage fee or a commission may be deducted from the payment. In other embodiments the currency exchange system is configured to operate without any cost to users, and the system is financed by advertising and/or any banking income/investment income that could be derived from the fact that the operator of the payment network system is holding large amounts of capital. In some embodiments the system is configured to store the capital of the payment network system in bonds that have a duration distribution that provides still positive income.

Ideally phases 200, 210 and 220 happen instantly within a unified global secure network, which can be realised e.g. with a VPN. In some embodiments, the whole social payment network is run from a bank, in that the VPN and the contents i.e. the funds of the users are all stored in a bank.

In phase 230 the customer is configured to make the payments and currency is debited from the customer financial account associated with the social network or social payment network. In some embodiments the financial account is always maintained in the home currency of the user. I.e. for example by default the payer is debited in the currency of his account and/or credit card, and/or the payment recipient is credited in the currency of his account and/or credit card. Vendor therefore subsequently receives payment typically in his own currency.

However, the user may also operate a multicurrency account, where he simply holds multiple currencies, and preferably pays upcoming purchases in the currency of the seller, if he holds that currency. The invention allows private consumers and small businesses to also affordably manage currency risk, leading to great benefits to the whole world economy.

In the electronic payment network, the customer in said payment network system sends at least one payment to at least one vendor via social network user profile of said customer. The vendor then in said payment network system receives the payment from the customer via social network user profile of said vendor. In this embodiment the payments flow through the normal social network profiles of the users.

In an alternative embodiment there is a separate Social payment application that can read information from the social network and use that information in preparing electronic documents of payments. The actual payments are transmitted in a preferably more secure network that may be realised e.g. as a VPN (Virtual private Network), or the like, alongside the social network. In some embodiments also payment data may be copied from or outputted back to the social network.

Any features of embodiment 20 may be readily combined or permuted with any of the other embodiments 10, 30, 40, 50, 60, 70, 80 and/or 90 in accordance with the invention.

Figure 3:
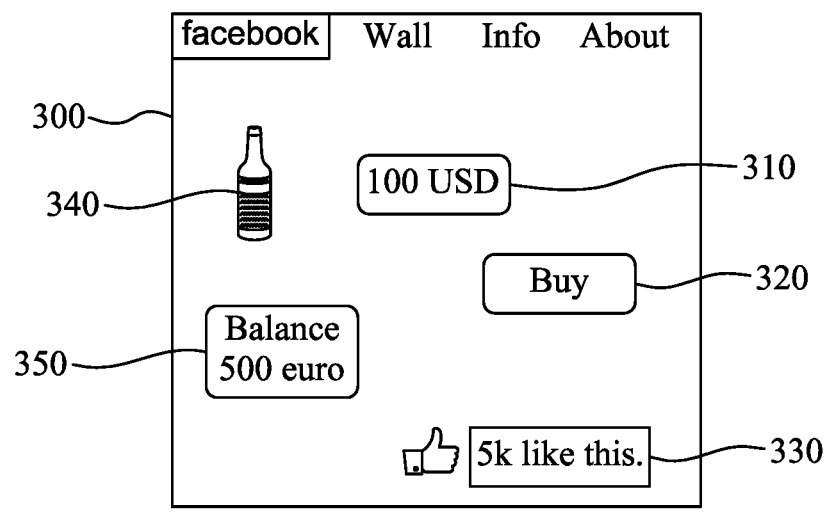
FIG. 3 demonstrates an embodiment 30 of the software programme product in accordance with the invention as a screen shot diagram.
Figure 3:
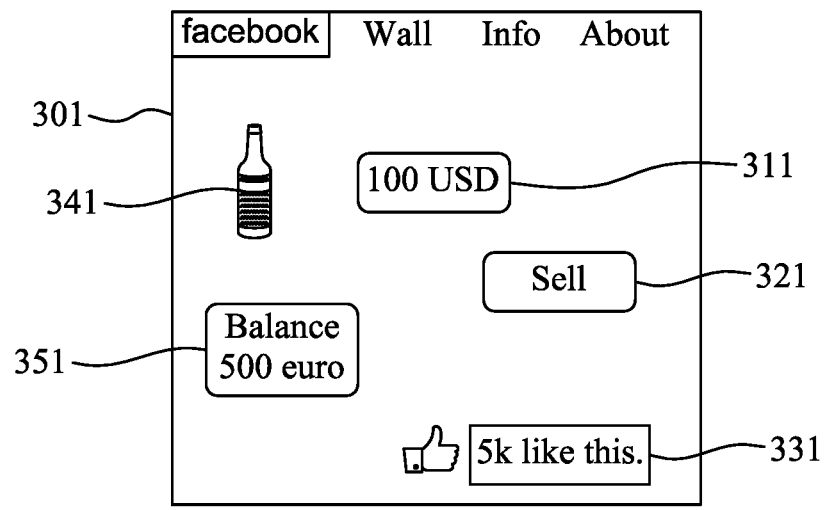

FIG. 3 demonstrates an embodiment 30 of the invention as a screen shot diagram. FIG. 3 shows screen window 300 of a social network profile when viewed with A smartphone, tablet or a computer. In it the customer will get the option to buy a product 340, which can be anything like an exotic bottle, as in this case. In some embodiments the product can be replaced by a service. The product or service is delivered in the usual ways such as FedEx, mail Courier, or with a drone in some embodiments.

FIG. 3 shows screen item 310 that provides the price of the product. The price of the product can be a constant, or it can be variable, based on supply and demand, or inventory, for example in some embodiments.

Screen item 320 shows the "buy" button that will complete the transaction from the social payment account of the user. In one embodiment 100 USD is deducted from the euro account in euros, in another embodiment the euro sum matching 100 USD at that time is provided to the financial account of the vendor. A currency payment from a first currency to a second currency is configured to be settled with a currency exchange within the said payment network system. In some other embodiments the vendor and/or customer or both are asked for approval for the exchange rate on a separate screen and/or screen item.

Screen item 350 shows the balance on the social payment network account, wherein the user has 500 euros. In some embodiments the payer is configured to be debited in the currency of his account and/or credit card and/or the payment recipient is configured to be credited in the currency of his account and/or credit card. However, in other embodiments the screen item 350 may have multiple currency accounts and their respective multiple balances.

The screen 300 and/or any of the screen items may be realised within the screens of the social network user interface, or alternatively as a separate application. For example, as a social payment application that may be used to realise the screen 300 and its items 310-350 to the consumer smartphone display. When the screen is initiated and "Buy" button is pressed, at least one customer in said payment network system is configured to send at least one payment to at least one vendor via social network account.

Alternatively, a separate social payment network may be realised in a different application that reads data from the social network or messaging software or contact directory software of the smartphone.

Similarly, at least one vendor in said payment network system can be configured to receive at least one payment from at least one customer via social network user profile of said vendor, and/or a separate social payment network may be realised in a different application that reads data from the social network or messaging software or contact directory software, or ERM (enterprise resource management) software of the vendor.

The lower screen 301 shows the screen view from the perspective of a seller/vendor. It is also possible that the sale by the vendor requires the pressing of the "Sell" button 321, as shown in screen 301.

Any features of embodiment 30 may be readily combined or permuted with any of the other embodiments 10, 20, 40, 50, 60, 70, 80 and/or 90 in accordance with the invention.

Figure 4:
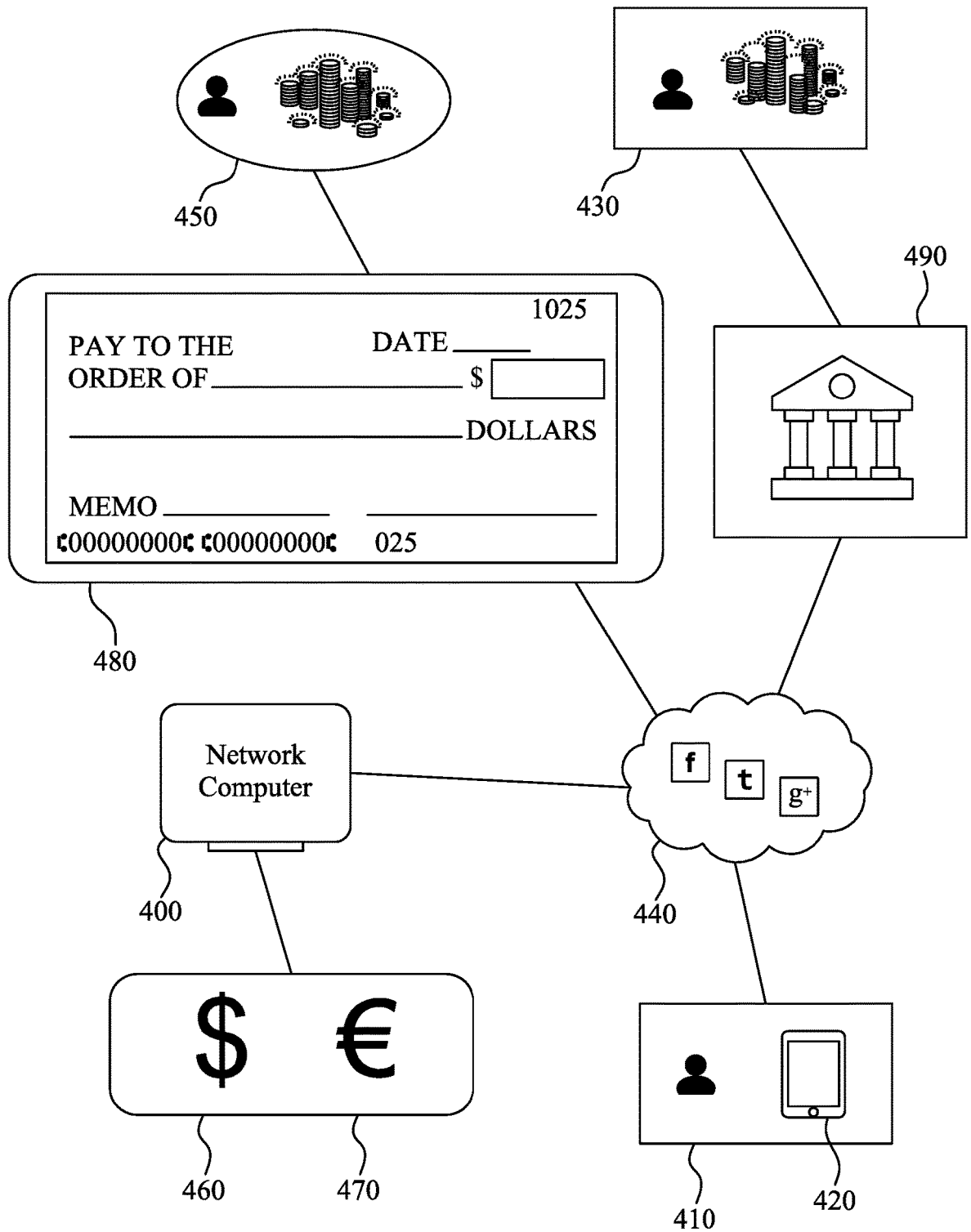
FIG. 4 demonstrates an embodiment 40 of a more elaborate payment network system in accordance with the invention as a block diagram.

FIG. 4 demonstrates an embodiment 40 of the invention as a block diagram. FIG. 4 is the elaborated version of the FIG. 1 and the items 400, 410, 420, 430, 440 correspond to the items 100, 110, 120, 130 and 140 as they were explained in FIG. 1. FIG. 4 is used to explain some of the more developed functionalities of the invention.

FIG. 4 shows an invoice 490 that the vendor 420 may send to the customer 410 via the social network 440, or a dedicated social payment network. Many of the details of the invoice may be retrieved from the social network profiles of the customer 410 and vendor 430, respectively. The invoice 490 with the filled details may be sent to the social network profile of the customer 410 for approval in some embodiments. The customer 410 receives the invoice 490 to his social network application, like the Facebook app or the like, on his mobile subscriber terminal 420. The customer may then simply approve the invoice 490, in which case the invoice 490 will be paid from the social network financial account of the customer 410. The payment may go through the social network 440, or alternatively the invoice 490 and/or the payment may be communicated in a social payment network that is run in parallel with the social network 440.

Alternatively, the customer 410 may send a cheque 480 to the vendor 450 via the social network 440. The details to fill information on the cheque 480 could be collected automatically from the social network profile and/or account of the vendor 450 and/or the customer 410. The financial traffic of payments, cheques 480 and/or invoices 490 is in some embodiments handled by the network computer 400, which may be a computer belonging to at least one social network 440.

Options on how to implement network computer 400 are as follows. One alternative is to have at least one dedicated network of computers in the social network to exclusively do payments. The other is to take the network computers out of the social network and put them into a separate social payment network and implement data import/export functionalities and security measures therein. In the third alternative at least one network computer 400 is doing both operations that of the payments and those of the social network.

In other embodiments the network computer 400 may belong to a social payment network that is separate from the social network 440, but can read data from the social network. For example, when filling an invoice 490 or a cheque 480 the inventive system may include the photo of the payer or the payee from the social network profile and/or account to the cheque and/or invoice to assist in recognisability. One way to implement this is to use an existing payment network like VISA or MASTERCARD network, and import the social network functions such as photo uploads, formation of connections, messaging and sharing into the payment network software, or Internet Bank software that operates a payment network.

In some embodiments, at least one social network profile is configured to produce an electronic invoice which is configured to be sent to a customer via said social network profile to the social network profile of the customer, and optionally the customer may send a payment in response to the invoice from his social network profile to the social network profile of the sender and/or vendor of the electronic invoice. Alternatively, the aforementioned traffic could take place via a dedicated social payment network and social payment apps that would be able to import details from at least one social network 440.

FIG. 4 also shows the currency exchange system as for example US dollars 460 and euros 470 are exchanged by the network computer 400, or somewhere under the control of the network computer 400 in some embodiments. Preferentially the currency exchange is performed within the social network 440 or the social payment network to avoid and/or mitigate any bank or credit card charges. The past, present and future invoices 490 and/or cheques 480 can be readily stored either in the social network app, or a social payment network app of the invention, and/or online in the server network of the invention.

In the invention the vendor 450, 430 and/or customer 410 have at least one social financial account each associated with their social network user profile, unless a social financial account is shared with multiple users. Alternatively, it is also possible that one social network user has multiple social financial accounts in accordance with the invention. A received payment via a social network or a social payment network is added to the balance of the said financial account and a sent payment via social payment network is subtracted from the said financial account. The social network profile data is configured to be used in producing an electronic invoice 490 and/or cheque 480.

Past, present and/or future payments are configured to be stored with the social network profile and/or a separate social payments profile, and optionally kept in an electronic ledger providing double entry bookkeeping. Past, present and/or future payments between parties can also be searched and account statement can be prepared between two parties in accordance with the invention.

When money is uploaded to the social network or social payment network, a bank account transfer is typically configured to be used to upload money to at least one social network profile and/or social payment profile, and optionally this bank account transfer is to an account in the same jurisdiction to minimise international bank transfer fees. The currency exchange rate 460, 470 used is configured to be retrieved from a third party and/or shown to the payer and/or payment recipient for approval.

Any features of embodiment 40 may be readily combined or permuted with any of the other embodiments 10, 20, 30, 50, 60, 70, 80 and/or 90 in accordance with the invention.

Figure 5:
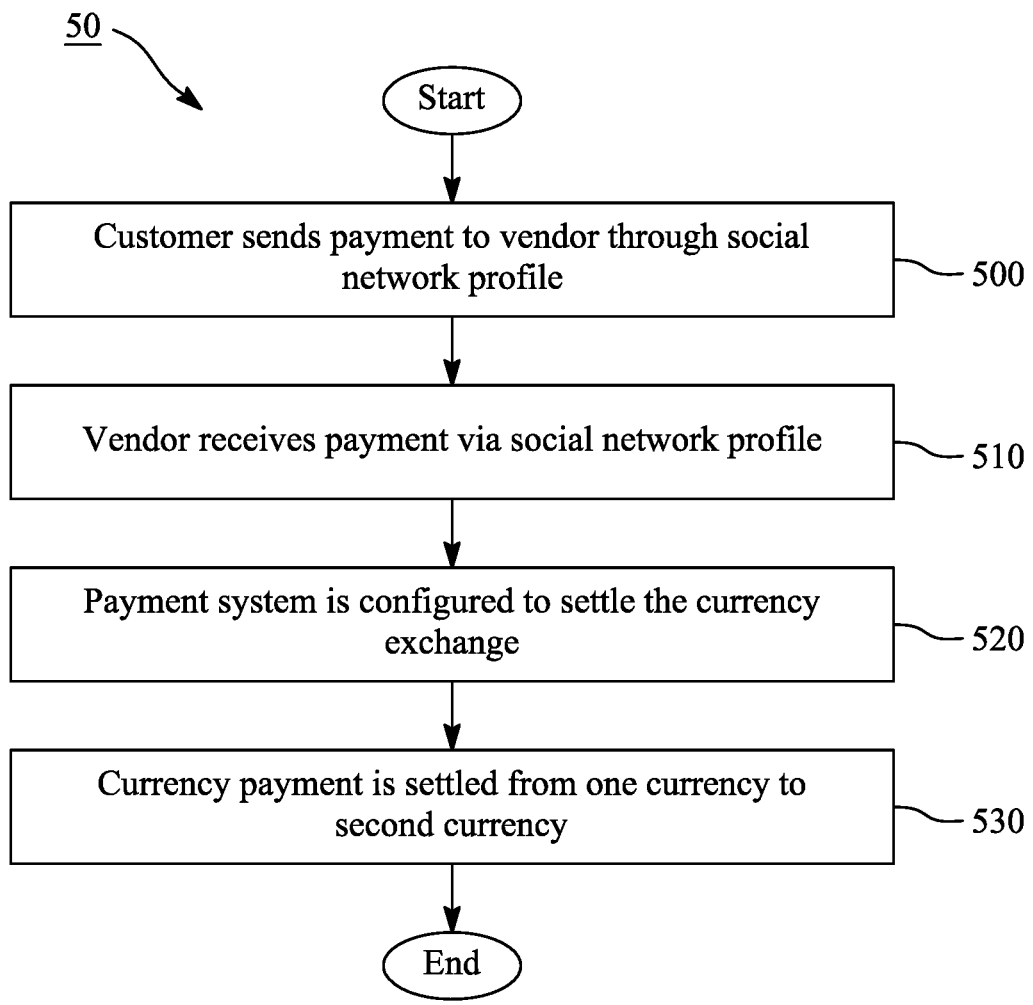
FIG. 5 demonstrates an embodiment 50 of a more elaborate method for transacting a payment in an electronic payment network in accordance with the invention as a flow diagram.

FIG. 5 demonstrates an embodiment 50 of the invention as a flow diagram. FIG. 5 shows a currency transaction from a first currency to another, wherein a vendor and/or customer have at least one financial account associated with their social network user profile. The financial account is either directly integrated into the social network in one embodiment, or there is a social payment network using a different security standard for financially sensitive data. This social payment network typically can import information and details from the social network back and forth, typically under strict information security.

FIG. 5 shows phase 500 where customer sends a payment to vendor from his financial account associated with his social network profile. Alternatively, the vendor social network profile details and/or the customer social network profile details could be imported from the social network to an app or web browser based payment program for facilitating payments without requiring as much data entry as is currently required.

Alternatively, in some embodiments, at least one social network profile of a vendor is configured to produce an electronic invoice which is sent to a customer via said social network profile to the social network profile of the customer, and optionally the customer may send a payment in response to the invoice from his social network profile to the social network profile of the sender and/or vendor of the electronic invoice. Typically, social network profile data is used in producing an electronic invoice 490 and/or electronic 480 and/or paper cheque.

FIG. 5 also shows phase 510 where the vendor receives the payment to his financial account with the social network profile of the vendor. Alternatively, the payment could be received to a social payment network identity associated with the social network profile of the vendor. Therefrom, in some embodiments, the data could be copied or imported onwards to the vendor's social network profile.

In phase 520 the social network payment system is configured to settle the payment with the currency exchange. In this phase, the system recognises that the payment is requested or made at one currency, e.g. USD, and the purchaser has some other currency on his account only, say euro.

When detecting this, the system finally settles the payment from one currency to second currency in phase 530 typically within the social network or within the social payment network. The currency exchange rate used is retrieved from a third party and/or shown to the payer and/or payment recipient for approval in some embodiments. Past, present and/or future payments are stored with the social network profile or a separated social payment network profile, and optionally kept in an electronic ledger providing double entry bookkeeping.

Also with currency transactions, a received payment via social payment network is added to the balance of the said financial account and a sent payment via social payment network is subtracted from the said financial account. A bank account transfer can be used to upload money to at least one social network profile, and optionally this bank account transfer is to an account in the same jurisdiction to minimise international bank transfer fees.

Any features of embodiment 50 may be readily combined or permuted with any of the other embodiments 10, 20, 30, 40, 60, 70, 80 and/or 90 in accordance with the invention.

Figure 6:
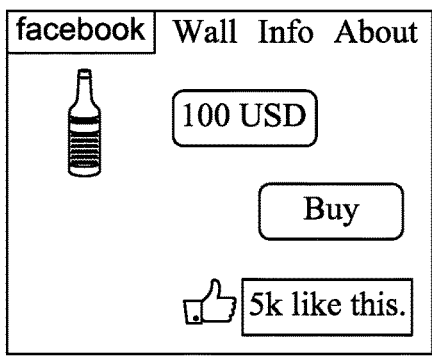
FIG. 6 demonstrates an embodiment 60 of a more elaborate software programme product in accordance with the invention as a screen shot diagram.
Figure 6:
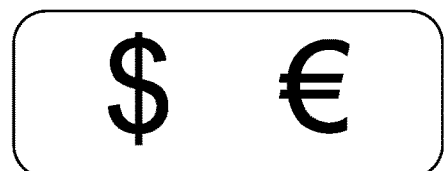
Figure 6:
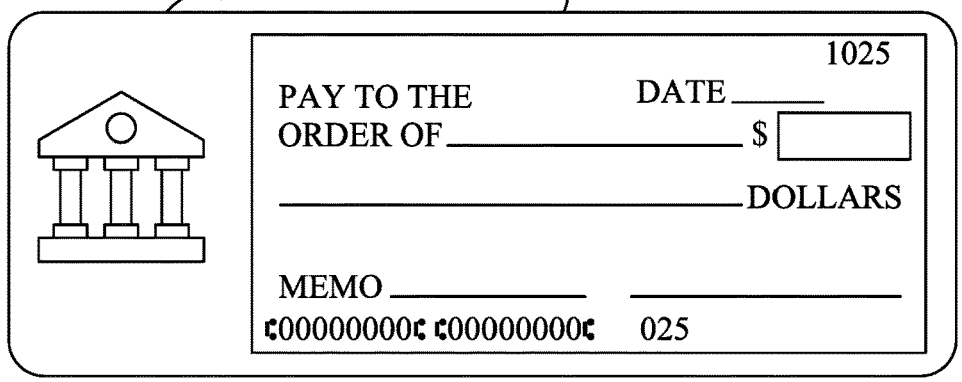
Figure 6:
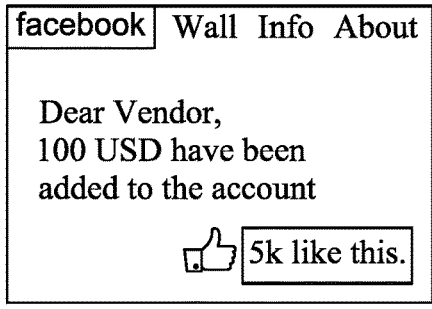
Figure 6:
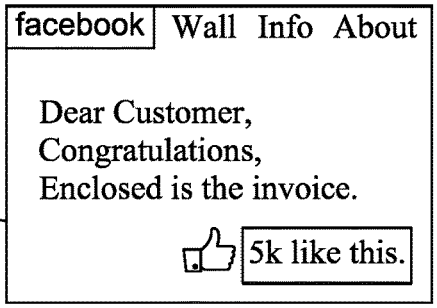

FIG. 6 demonstrates an embodiment 60 of the invention as a screen shot diagram. FIG. 6 is an elaborated version of FIG. 3 as a screen shot diagram which demonstrates a software program in which vendor and/or customer has at least one financial account associated with their social network user profile, and a payment received via social payment network is added to the balance of the said financial account and a sent payment via social payment network is subtracted from the said financial account. The screen 600 is similar to screen 300. When the user presses the "Buy" button on screen 600 a payment is made or an invoice is requested. Social network profile data is configured to be used in producing an electronic payment document, electronic invoice and/or an electronic cheque.

For example, at least one social network profile is configured to produce an electronic invoice which is configured to be sent to a customer via said social network profile to the social network profile of the customer, and optionally the customer may send a payment in response to the invoice from his social network profile to the social network profile of the sender and/or vendor of the electronic invoice. The currency exchange rate used is configured to be retrieved from a third party and/or shown to the payer and/or payment recipient for approval.

FIG. 6 shows the confirmation of payment on screen 650, which is displayed to the vendor who will receive this notice in the social network profile associated with the vendor. FIG. 6 also shows the item 660 where customer would be receiving the confirmation message and the invoice in his social network profile.

FIG. 6 also shows the screen 670 where electronic ledger providing double entry bookkeeping gets updated after the transaction is successful at both of the ends i.e. customer/vendor. The past, present and/or future payments are configured to be stored with the social network profile, and kept in the electronic ledger 670 providing double entry bookkeeping. Alternatively, a separate social payment network profile can be maintained for keeping the ledger 670 in some embodiments.

In order to put money into the social payment network system in the first place, a bank account transfer could be used, or the user could set up his salary to be paid to his social financial account on the social network. The bank account transfer could be used to upload money to at least one social network profile, and optionally this bank account transfer could be to an account in the same jurisdiction to minimise international bank transfer fees.

Any features of embodiment 60 may be readily combined or permuted with any of the other embodiments 10, 20, 30, 40, 50, 70, 80 and/or 90 in accordance with the invention.

Figure 7:
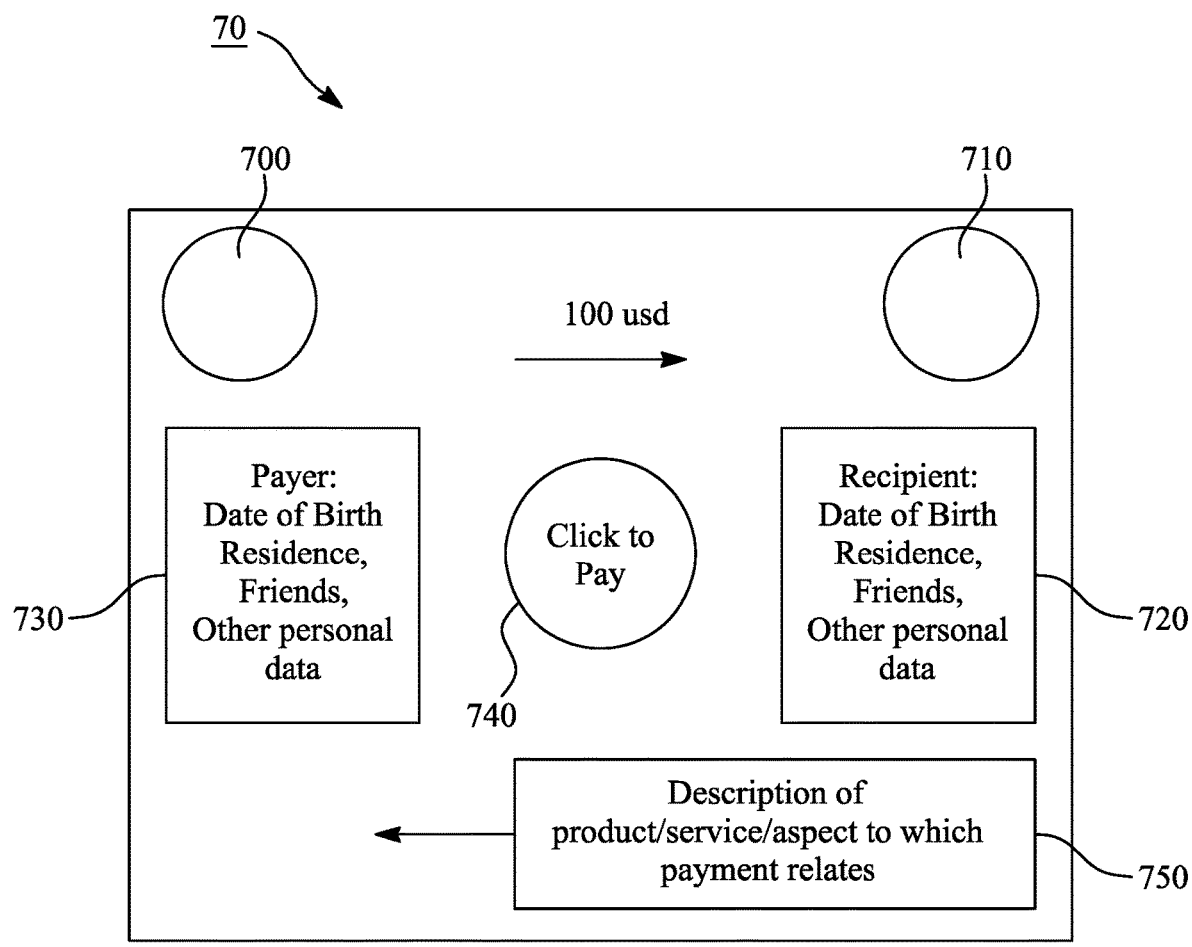
FIG. 7 demonstrates an embodiment 70 of a cloud and/or app based social payment in accordance with the invention as a screen shot diagram.

FIG. 7 shows an embodiment of a social payment of the invention. The embodiment 70 is either the screen of a social payment app, or a social network screen with the payment functionality. In one implementation, the social payment app is realised by a strongly encrypted app that only holds the electronic money on the balance of the social payment account, the identity of the owner of the account, and ways to recognise the owner. For example, biometric identification like the fingerprint, security questions, user IDs, passwords and PIN codes and the like can be used to authenticate the owner of the account.

The social payment app may then import data from a social network to the app, such as the photo of the Payer 700, personal details 730 such as Date of Birth, address, Residence, Friends or the like. This data is simply available by the social payment app reading the contents of the social network app, such as Facebook or the like. For example, a social payment app of the invention can be developed for each Facebook/Apple, Facebook/Android, Facebook/Windows version, or depending on the universality of Facebook app interfaces, only one Facebook compliant Social network application can be devised.

Now, preferably the social payment network can also import the details of the fee recipient from Facebook in some embodiments. For example, the photo of the recipient 710 or identifying data 720 such as Date of Birth, address, Friends or other personal data could be transported. In the event the payment recipient is a "Friend" with the Payer on the social network, the Recipient details 710, 720 can be retrieved via the social network user account of the Payer. If the recipient has a bank account or credit card associated with his social network profile, the payment could be wired directly there.

However, this may incur unnecessary wire fees or credit card fees at least to some extent. Therefore, preferentially, the recipient also has a similar social payment network application installed on his mobile terminal and/or computer. This social payment network application will have a social financial account configured with it and/or or the social payment network server computer 100 and the payment is received there, avoiding bank service charges, as nothing is sent to the bank, but the funds are rather kept in the social financial account in the cloud network.

The social payment network applications will connect through the social network, or via the Internet or telephony network, typically forming a VPN (Virtual Private Network). Alternatively, the social financial account number of the fee recipient will be looked up from the server computer 100 and/or 400. When the social financial account number is retrieved, this can be indicated to the Payer, for example by flashing or turning the Click to Pay button 740 as green in colour.

When the button 740 is pressed to complete the payment, the social payment network system will deduct the sum paid, i.e. 100 USD in this case, from the social financial account of the payer. Respectively the social payment network will add 100 USD to the social financial account of the recipient. In some embodiments, a fee is charged for the transmission. In other embodiments the money transfer is free, and advertisements are displayed to the sender and/or recipient of the payment. Before, concurrently or after the payment, a description of the product or service or any description of any aspect to which the payment relates 750 is relayed back to the Payer and/or a copy of this description 750 is saved to the recipient. This way either the social payment applications and/or social network user profiles of the payer and/or payment recipient will be able to store informative records of payments that show what? was transacted with whom? and for how much? And When?, and this is a huge improvement to prior art technology. For example a photo of the product or service bought, and/or the venue from which the product was bought, could be included in description 750 in accordance with the invention.

The prior art credit card statement or bank statement that typically lists an obscure company name that does not describe the entity with whom business was conducted, many times a couple of days late, will be a thing of the past for the users of the present invention.

For businesses that currently use credit card terminals the inventive social network payment has a clear advantage. The consumers can make inventive social network payments directly to the social network profile or social network payment account of the vendor, and the payments end up directly to the cloud, i.e. the server network, where the payment data is secure and accessible to other software modules that the vendor may use. For the consumer, the payment details are also in the cloud, from which they are harder to steal, than e.g. a credit card from the hand of the consumer. Both the vendor and/or the consumer can be connected to the cloud, social network, and/or social payment network via the fixed or cellular telephony network or the Internet, and also via short range communication connections that are proximity based, such as Bluetooth, iBeacon, Wi-Fi, NFC, IrDA or the like.

Any features of embodiment 70 may be readily combined or permuted with any of the other embodiments 10, 20, 30, 40, 50, 60, 80 and/or 90 in accordance with the invention.

Figure 8:
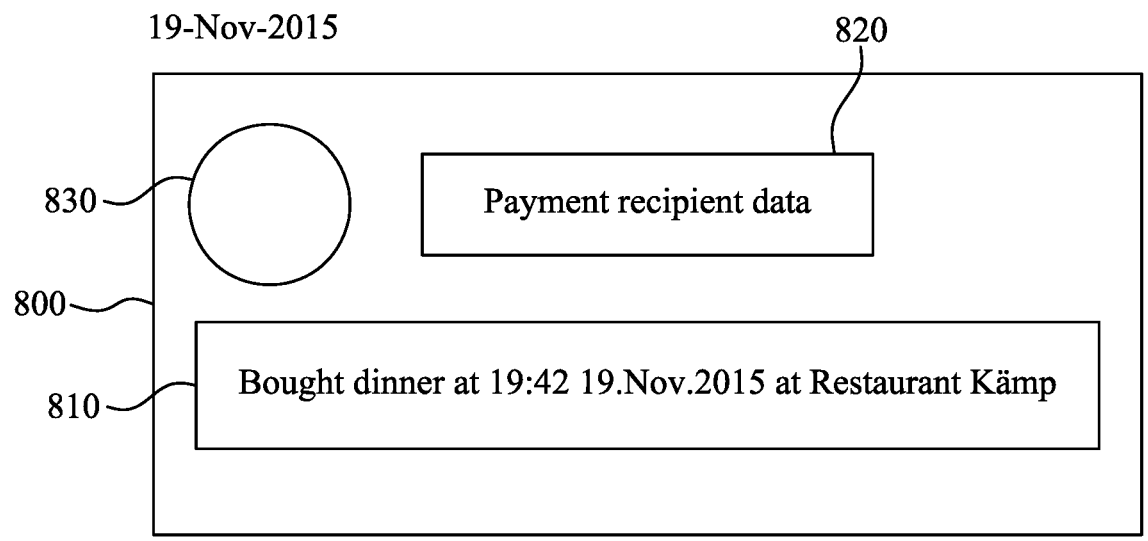
FIG. 8 demonstrates an embodiment 80 of a cloud and/or app based social payment statement in accordance with the invention as a screen shot diagram.
Figure 8:
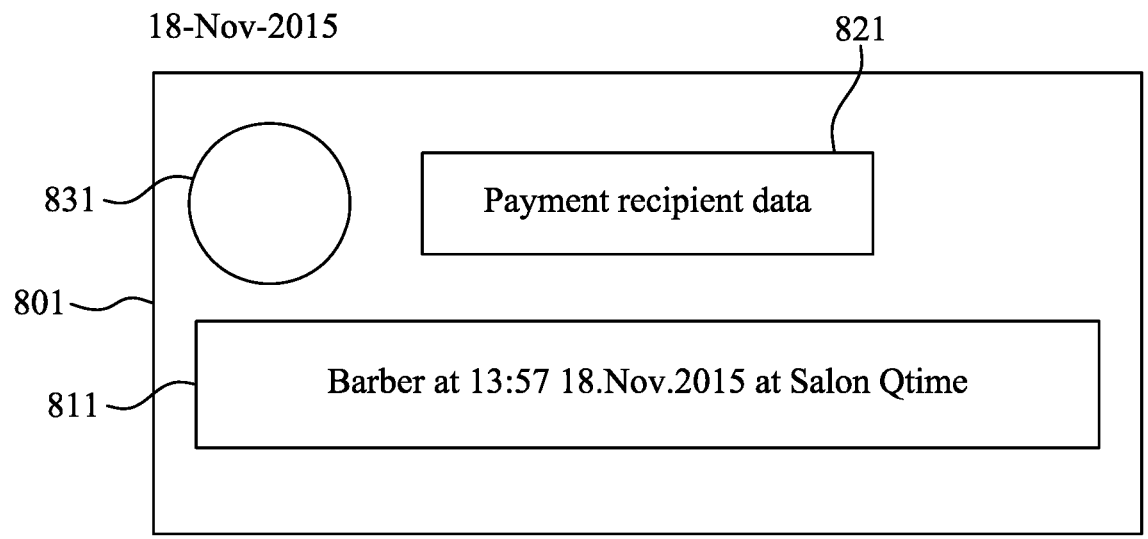

FIG. 8 shows an embodiment of a social payment statement 80 for John Smith, a fictitious user. Two fees paid by John Smith are listed in this payment statement embodiment 80. On 19 Nov. 2015 John Smith had dinner at Restaurant Kamp, downtown Helsinki. The social payment network system of the invention can import the photo of Restaurant Kamp into photo screen 830, for example from the webpage of Restaurant Kamp or social network page of restaurant Kamp, and provide the payment recipient data in screen item 820, and provide a computer synthesized "layman" explanation of what was bought in screen item 810. In some embodiments the screen item 810 summarizes the data content of the payment receipt that was provided in response to the payment by the vendor on the 19 Nov. 2015. Preferably the payment and/or receipt are both communicated electronically, so the contents of the payment documents are accessible to determine the nature of the products transacted. Also in one preferable embodiment when the electronic payment is made, the location of the mobile subscriber terminal and the time of day are stored into memory, either on the terminal or on the cloud network. The location and/or the time of day can be used to further define and/or determine the payment recipient separately or in combination with information in the payment documents.

Suppose for example that the measured location matches that of restaurant Kamp on the street Pohjoisesplanadi in Helsinki. This determination can be done for example by comparing GPS co-ordinates with an electronic mapping service such as Google Maps.

Suppose further that the time of day matches with the opening time of this restaurant. This can be done by comparing the recorded time of day with an Internet service that lists the opening times of the companies at the already determined place. One such service is Google Places, but also peer reviewed services such as Yelp or the like could be used to determine the opening times of different venues.

Suppose even further that the legal entity "Kamp group" on the invoice is indeed determined to be a trade name of a company that operates restaurant Kamp. This last determination can be done by looking up the Internet and/or a company register database.

All of these positive indications can be used separately or together to determine that the real payment recipient is in fact the commercial entity that is operating the restaurant Kamp social network pages, with pictures of the restaurant, and one picture can be synchronized into screen item 830. If the payment recipient is determined accurately, but is determined not to have a social network page, but nevertheless is determined to have a webpage, may a picture from that webpage be retrieved to the photo screen item 830. On $18^{th}$ November the same process was repeated for the barber shop Salon Qtime, as John Smith had a haircut there.

It should be noted that the invention can be implemented for example on an existing electronic banking payment software system, or a computerised credit card payment system such as used with VISA, MASTERCARD, AMEX or the like by adding the cloud software to search and import the aforementioned details (photo, tradename) from at least one social network and/or the Internet. By implementing the invention in this fashion the existing high data security structure of electronic payment networks can be used, and the data therein can be enriched with imported Social network data to increase payment counterparty recognisability and eliminate human errors or misunderstandings.

The other implementation strategy of the invention which has been primarily discussed in this application works vice versa. The secure payment network functionality is either integrated in an existing social network as a feature, which will have the payment statement enriching and clarifying data synchronization processes of embodiment 80 as explained earlier.

Or the secure payment network is realised in parallel with an existing social network, such as Facebook, for example as a separate but interoperable app. Then the social network enriching data, such as photos and other identifying data, can be readily imported to the social payment network and/or its app, to increase payment counterparty recognisability and eliminate human errors and misunderstandings. The importation of social network data is useful both in the payment situation 70 as well as in the bookkeeping of historical purchases on a payment statement 80.

Furthermore, transactions can be searched based on the more enriched data. For example an account statement between parties John Smith and Salon Qtime can be compiled in accordance with the invention.

If the invention is implemented as explained here into an existing social network, it might become rational for the social network to issue conventional credit cards in its own name to further provide use for the social payment network that it is operating.

Any features of embodiment 80 may be readily combined or permuted with any of the other embodiments 10, 20, 30, 40, 50, 60, 70 and/or 90 in accordance with the invention.

Figure 9:
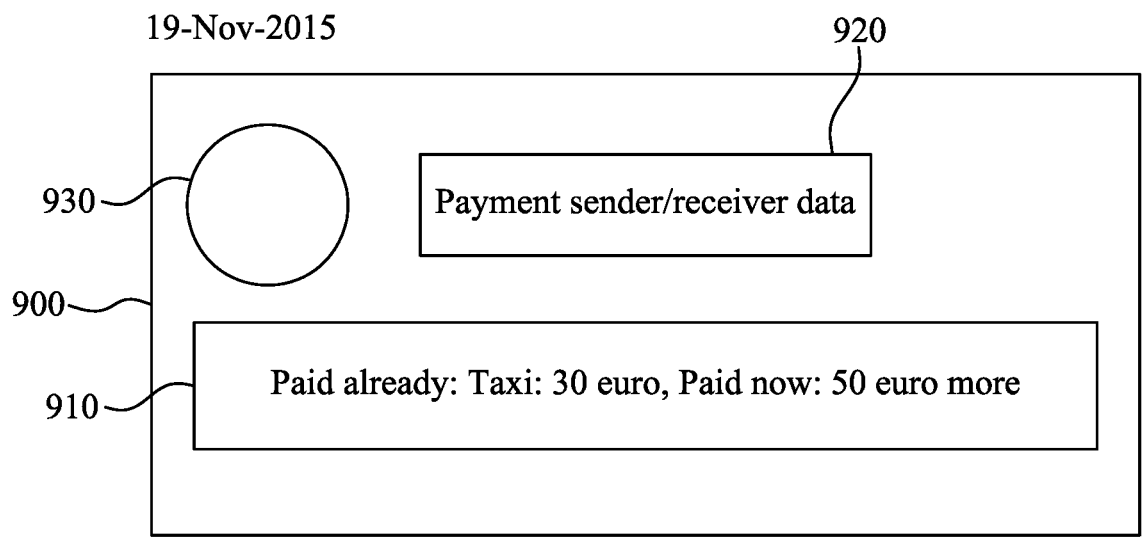
FIG. 9 demonstrates an embodiment 90 of a cloud and/or app based social co-payment and/or investment statement in accordance with the invention as a screen shot diagram.
Figure 9:
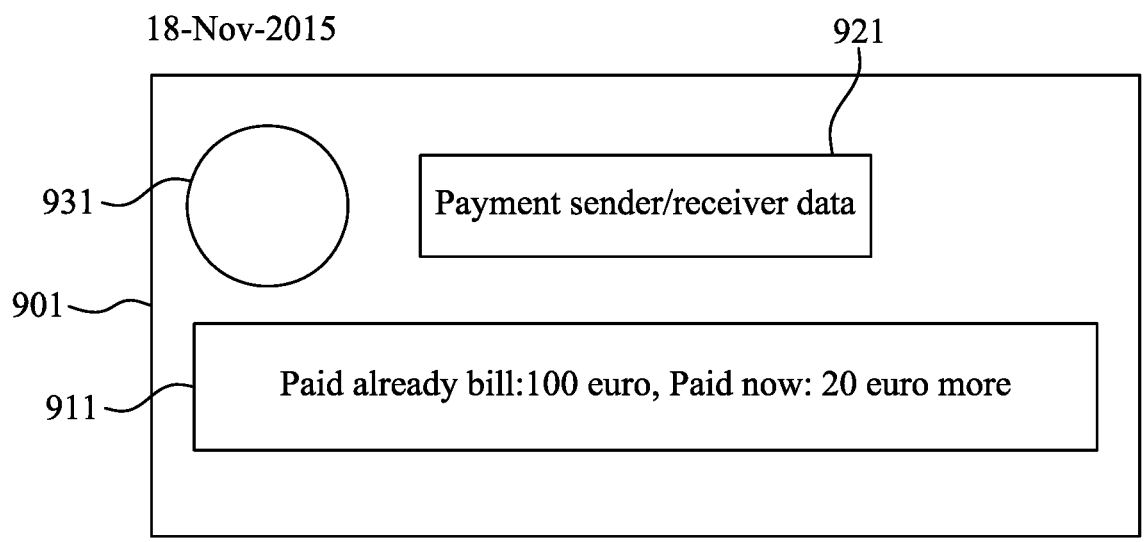

FIG. 9 shows an embodiment of the invention that allows the collection of a payment or an investment from a plurality of participants in a seamless social way. In the social payment/investment statement for a group named "Thirsty Thursdays" John Smith is the administrator. Participants of the group have sent and/or posted payment events on 19 Nov. 2015 and 18 Nov. 2015 as shown. In this hypothetical example the participants took a taxi and went for dinner and drinks together. They now want to split the costs based on the payments they have made and/or are about to make.

One participant who paid the bill at the restaurant posted on the 18 Nov. 2015 his payment. The screen item 931 may contain the photo of the person/participant posting the message and/or payment event in some embodiments. This participant paid the bill of 100 euros and shares a copy of his social payment with the other participants in the group, and the paid bill is reflected on the screen item 911. This screen item may include a copy of the payment between the user and the restaurant or a link to the payment, invoice and/or receipt.

This participant may also define a further payment, 20 euros, which is reflected on the right hand side of the screen item 20. The participant may define the current payment as he wishes, for example by setting it "20 euros or more". This means that in all events the participant will pay 20 euros in addition to the 100 euro bill he already paid, making his own contribution 120 euro or more. The "or more" option can be exercised, for example by the system or administrator, when all the participants have entered their payments. For example, if the total falls short, those people with "or more" specified payments can be drawn to contribute more. Similarly, people can impose other constraints for example "20 euros extra or less", which means that at a maximum 20 euros can be drawn from the payment authorisation of that participant, but if the need for contribution is less, then less money based on e.g. some defined rule or proportioning in the group will be used to determine and draw smaller sum from that participant.

This social multipayment functionality can be used in a variety, in fact almost all banking activities that are carried out by banks, investment banks and so forth. Not only is it possible to co-ordinate a restaurant visit or an evening out for a dispersed group of people, it will also be possible to co-ordinate bond and/or equity emissions of small or large companies with the present invention. Instead of a bank sending multiple investment prospectuses and agreements via mail, and people making payments via bank transfer or cheque and phoning and negotiating with brokers, people can simply enter their bids and constraints for their bids onto the social payment/investment platform 90, and see whether the market takes their bid favourably and executes it. Any investments that the users actually buy, might be held in their social financial accounts in addition to money in accordance with the invention.

It should be noted that the social payment network can be registered to multiple governments and/or government watchdogs. For example, for the purpose of holding money on the accounts and sending it, a banking permit might be required in some jurisdictions. Similarly, the facilitation of any investment, lending or the like might require a banking permit or a brokerage permit from a government authority like the SEC, FSA or the like. It is in accordance with the invention to operate a global payment network that holds permissions from multiple approval granting authorities from different countries.

Any features of embodiment 90 may be readily combined or permuted with any of the other embodiments 10, 20, 30, 40, 50, 60, 70 and/or 80 in accordance with the invention.

As we have seen in the earlier embodiments, the integration of electronic payment and social networks allows exciting benefits to consumers. It should be noted that in all the embodiments, for example the sharing of the information of a payment can be performed similarly to the sharing of e.g. photos on present social networks. I.e. the recipients are just selected from the user profile, to whom payment data, invoice, cheque or the like is shared and the sharing is sent.

For example, suppose a user makes job related purchases via his social financial account. He can share the purchases and the payment data, for example as an invoice to his employer. It is also possible to script the user profile so, that all purchases labelled "work" are operated in the aforementioned way. Quite clearly this leads to considerable administrative time savings for all people and workers who do not have a corporate credit card, but who still need to make job related purchases. It is in accordance with the invention to share just the information in the financial transaction, e.g. info that "I have paid this", or an actionable financial transaction in itself. For example, a shared invoice can be paid or a shared cheque can be cashed by the party with whom this actionable financial transaction was shared in accordance with the invention.

Similarly, it should be noted that a social network connection in a social payment network allows very surprising time saving possibilities via scripting. For example, if the connection is trusted, such as e.g. the utility company, the user's own child or the like, an Autopay function can be scripted into the user profile. This is useful but can be expensive to users with slightly older children.

For example, a father or a mother can script his user profile so that their son Charlie, who is backpacking in Australia, can always withdraw money from their accounts without an approval or upon approval. This may take place by the son for example by sending an invoice that the social payment network pays automatically, or providing withdrawal rights to the son on the parent's social financial account. The invention saves the parents the trouble of waking up at night in the UK to Charlie's phone call and listening to his explanation that he lost his credit cards while boozing with his friends. Further subsequent to the phone call, there is no need to go urgently to a bank or western union or the like to send more money. The parent knows that he has no choice but to send the money Charlie needs, so he might as well make it available in case of emergency in the social payment network. Therefore, it is in accordance with the invention in all embodiments to provide different functionalities, such as automatic payment, to parties with whom the user is connected on the social payment network.

It is also possible that citizens or small businesses are connected with their tax officials and/or welfare agencies on the social payment network in accordance with the invention. For example, the payments of all welfare support, salary income, capital income/gains/losses, and so on could be automatically shared with the tax officials and/or welfare agency officials. This can take place via a continuous, or a periodic connection, e.g. once a month or year in any of the earlier explained embodiments. The invention therefore allows all the people to keep actuarial/accountancy costs under control, even as benefits and taxation systems grow more complicated almost everywhere as a global trend.

The invention has been explained above with reference to the aforementioned embodiments and several commercial and industrial advantages have been demonstrated. The methods and arrangements of the invention allow people to make payments directly from the social network profile without the presence of their credit card or bank account details. The social payment network app of the invention is integrated with a server network, which incorporates all or most of the functions of credit cards, Internet banking and money order companies by using the data and functions already available in the social network. The invention provides better counterparty recognition, reduces the chance of fraud, or fraud, and provides a cheaper payment platform to consumers or small businesses while also reducing the administrative burden in making and paying purchases or reporting payments and/or expenses to third parties, such as the employer or tax administration. The invention allows consumers to accurately recall what was bought from whom. The invention allows vendors of products and services to focus marketing efforts on the truly buying demographics based on the enriched social network data the buyers provide while paying.

The invention has been explained above with reference to the aforementioned embodiments. However, it is clear that the invention is not only restricted to these embodiments, but comprises all possible embodiments within the spirit and scope of the inventive thought and the following patent claims.

REFERENCES

U.S. Pat. No. 8,812,392 B2, METHOD AND A SYSTEM FOR INTERACTING AND TRADING AMONG USERS OF ONLINE SOCIAL COMMERCIAL NETWORK, granted on Aug. 19, 2014, Shahghasemi.

"Pay Dialog—Payments for games," accessed at https://delelopers facebook.com/docs/payments/reference/paydialog, accessed on Nov. 26, 2015.

The invention claimed is:

1. A social payment network system comprising:
a processor; and
a non-transitory memory medium including instructions that when executed by the processor provide a mobile customer device application configured to:
collect, from a social media application running on the social payment network system, customer social media account data for a customer engaged in a transaction;
collect, from the social media application running on the social payment network system, vendor social media account data for a vendor engaged in the transaction;
collect, from a banking application running on the social payment network system, payment data for the transaction including a first currency that the customer submits for the transaction a second currency that the vendor accepts to complete the transaction;
authenticate the customer using a biometric identifier;
perform the transaction by sending payment within the social network via cloud, including settling an exchange from the first currency to the second currency via the social payment network system before depositing the second currency to a bank account associated with the vendor; and
compile a record of the transaction, including at least one of an invoice or an electronic cheque, based on the collected customer social media account data and the vendor social media account data synchronized with the payment data, wherein the payment data are shared with the social media application, and wherein neither the customer social media account data nor the vendor social media account data are released to the banking application; and
wherein the vendor social media account data and the payment data are displayed in a payment statement that includes:
a measured location of a mobile device involved in the transaction at a time when the transaction occurs, wherein the measured location is matched with a business located at the measured location in an electronic mapping service, wherein the time of the transaction is compared with an opening time of the business listed in an electronic peer reviewed service; and
a picture of a commercial entity matching the business that is synchronized onto a screen of the mobile device and displayed to the customer.

2. The system of claim 1, wherein a vendor device with a social network user account of the vendor produces an electronic invoice sent to a social network user account of the customer via the social payment network system, and the mobile customer device application sends a payment, in response to the electronic invoice, from the social network user account of the customer to the social network user account of the vendor.

3. The system of claim 1, wherein an exchange rate used for a currency exchange for the transaction is retrieved from a third party and shown to at least one of the customer and the vendor for approval.

4. The system of claim 1, wherein the transaction is performed via a mobile messaging application operating via a wireless data connection.

5. The system of claim 1, wherein the payment is sent via Near Field Communication (NFC) from the mobile device to the vendor and the payment statement is stored in a cloud network.

6. The system of claim 1, wherein the social media application is integrated with an operating system.

7. The system of claim 1, wherein the biometric identifier of the customer is used in a mix with a passcode or password to authorize the payment.

8. The system of claim 1, wherein the payment is sent to a PayPal account of the vendor.

9. The system of claim 1, wherein a record of the payment is sent to PayPal with a request for PayPal send an email invitation to the vendor to establish an account.

10. The system of claim 1, wherein a record of the payment is posted in a social network, and multiple users are permitted to send partial payments of the payment to a user posting the payment record.

11. The system of claim 1, wherein a camera of the mobile device takes a photograph of a credit card and Object Character Recognition is used to extract details of the credit card from the photograph.

12. A mobile device, comprising:
a near field communication (NFC) transceiver;
a screen;
a processor; and
a memory, including:
a social media application;
a payment application; and
instructions that when executed by the processor perform operations that include:
receiving, from the social media application, user account data for at least one of a vendor operating a vendor device or a customer operating the mobile device;
receiving, from the payment application, payment data for a transaction to conduct between the mobile device and the vendor device wherein the mobile device offers a first currency to complete the transaction and the vendor device requests a second currency to complete the transaction;
using a biometric identifier to identify a user of the mobile device;
sending a payment via an NFC message from the mobile device to the vendor device;
compiling a record of the transaction including the payment data synchronized with the user account data, wherein the record indicates a multicurrency payment from the first currency to the second currency settled in a currency exchange within the payment application; and outputting the record for review and the record as a payment statement, wherein the payment statement includes:
a measured location of the mobile device at a time when the transaction occurred;
an identity of a business at the measured location in an electronic mapping service, wherein the time when the transaction occurred is compared with opening times of the business listed in an electronic peer reviewed service, and
a picture of a commercial entity matching the vendor.

13. The mobile device of claim 12, wherein receiving the payment data includes sending a payment to the vendor device from a customer financial account based on the user account data received from the social media application.

14. The mobile device of claim 12, wherein the memory further includes:
an operating system for the mobile device, wherein the social media application is integrated with the operating system.

15. The mobile device of claim 12, wherein the user account data include photographs and operating times from a profile of the vendor from a social media service associated with the social media application.

16. The mobile device of claim 12, wherein the transaction is conducted via a mobile messaging application operating via a wireless data connection.

17. The mobile device of claim 12, wherein the payment statement is stored in a cloud network.

18. The mobile device of claim 12, wherein the biometric identifier of the customer is used in a mix with a passcode to authorize the payment.

19. The mobile device of claim 12, wherein the biometric identifier of the customer is used in a mix with a passcode and a password and a PIN code to authorize the payment.

20. The mobile device of claim 12, wherein a camera of the mobile device takes a photograph of a credit card and Object Character Recognition is used to extract details of the credit card from the photograph.

21. The mobile device of claim 12, wherein the payment is sent to a PayPal account of the vendor.

22. The mobile device of claim 12, wherein the payment is sent to PayPal with a request for PayPal send an email invitation to the vendor to establish an account.

23. The mobile device of claim 12, wherein a payment record of the payment is posted in a social network, and multiple users are permitted to send partial payments of the payment to a user posting the payment record.

24. A social payment network system comprising:
a processor; and
a non-transitory memory medium including instructions that when executed by the processor provide a mobile customer device application configured to:
collect, from a social media application running on the social payment network system, customer social media account data for a customer engaged in a transaction;
collect, from the social media application running on the social payment network system, vendor social media account data for a vendor engaged in the transaction;
collect, from a banking application running on the social payment network system, payment data for the transaction;
authenticate the customer using a biometric identifier;
perform the transaction by sending payment within the social network via cloud; and
compile a record of the transaction, including at least one of an invoice or an electronic cheque, based on the collected customer social media account data and the vendor social media account data synchronized with the payment data, wherein the payment data are shared with the social media application, and wherein neither the customer social media account data nor the vendor social media account data are released to the banking application; and
wherein the vendor social media account data and the payment data are displayed in a payment statement that includes:
a measured location of a mobile device involved in the transaction at a time when the transaction occurs, wherein the measured location is matched with a business located at the measured location in an electronic mapping service, wherein the time of the transaction is compared with an opening time of the business listed in an electronic peer reviewed service; and
a picture of a commercial entity matching the business that is synchronized onto a screen of the mobile device and displayed to the customer.

25. The system of claim 24, wherein the payment data include a first currency that the customer submits for the transaction a second currency that the vendor accepts to complete the transaction, and wherein performing the transaction includes settling an exchange from the first currency to the second currency via the social payment network system before depositing the second currency to a bank account associated with the vendor.

26. A mobile device, comprising:
a near field communication (NFC) transceiver;
a screen;
a processor; and
a memory, including:
a social media application;
a payment application; and
instructions that when executed by the processor perform operations that include:
receiving, from the social media application, user account data for at least one of a vendor operating a vendor device or a customer operating the mobile device;
receiving, from the payment application, payment data for a transaction to conduct between the mobile device and the vendor device;
using a biometric identifier to identify a user of the mobile device;
sending a payment via an NFC message from the mobile device to the vendor device;
compiling a record of the transaction including the payment data synchronized with the user account data; and
outputting the record for review and the record as a payment statement, wherein the payment statement includes:
a measured location of the mobile device at a time when the transaction occurred;
an identity of a business at the measured location in an electronic mapping service, wherein the time when the transaction occurred is compared with opening times of the business listed in an electronic peer reviewed service, and a picture of a commercial entity matching the vendor.

27. The mobile device of claim 26, wherein the mobile device offers a first currency to complete the transaction and the vendor device requests a second currency to complete the transaction, wherein the record indicates a multicurrency payment from the first currency to the second currency settled in a currency exchange within the payment application.

\* \* \* \* \*